United States Patent
Saitoh

(10) Patent No.: US 8,436,592 B2
(45) Date of Patent: May 7, 2013

(54) VOLTAGE BUCK-BOOST SWITCHING REGULATOR

(75) Inventor: Mitsuyori Saitoh, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 589 days.

(21) Appl. No.: 12/640,236

(22) Filed: Dec. 17, 2009

(65) Prior Publication Data

US 2010/0148740 A1  Jun. 17, 2010

(30) Foreign Application Priority Data

Dec. 17, 2008  (JP) .................... 2008-321465

(51) Int. Cl.
*G05F 1/24*  (2006.01)

(52) U.S. Cl.
USPC ........................ 323/259; 323/225; 323/271

(58) Field of Classification Search ............. 323/259, 323/225, 271, 299, 301, 288
See application file for complete search history.

(56) References Cited

U.S. PATENT DOCUMENTS

| 7,495,423 | B1* | 2/2009 | Knight et al. | 323/284 |
|---|---|---|---|---|
| 7,952,900 | B2* | 5/2011 | Tomiyoshi et al. | 363/98 |
| 2007/0210782 | A1* | 9/2007 | Prexl et al. | 323/288 |
| 2008/0079405 | A1* | 4/2008 | Shimizu | 323/282 |
| 2009/0146623 | A1* | 6/2009 | de Cremoux et al. | 323/271 |

\* cited by examiner

*Primary Examiner* — Harry Behm

(74) *Attorney, Agent, or Firm* — William B. Kempler; Wade J. Brady, III; Frederick J. Telecky, Jr.

(57) ABSTRACT

A stable, high-speed, high-efficiency constant voltage is provided without a complicated, large-scale, high-cost phase compensation circuit over a wide range of operating conditions. This voltage buck-boost switching regulator consists of a pair of voltage reducing transistors, a pair of voltage boosting transistors, inductance coil, output capacitor and controller. The controller has the following parts for performing PWM control of constant voltage for voltage reducing transistors and voltage boosting transistors: an output voltage feedback circuit, an inductor current sense circuit, a variable sawtooth wave signal generator, switching controllers, and a voltage boosting driver.

16 Claims, 13 Drawing Sheets

VOLTAGE BUCK-BOOST SWITCHING REGULATOR

CROSS-REFERENCE TO RELATED APPLICATIONS

This patent application claims priority from Japanese Patent Application No. 2008-321465, filed Dec. 17, 2008, the entirety which is incorporated herein by reference.

FIELD OF THE INVENTION

The present invention pertains to a switching regulator that converts the input DC power (DC) to any DC power (DC). Specifically, the present invention pertains to a voltage buck-boost switching regulator that can provide a constant output voltage independent of the input voltage.

BACKGROUND OF THE INVENTION

Switching regulator is a small, lightweight, high-efficiency DC power supply using semiconductor switching elements, and is in wide use in electronic devices, etc. In recent years, the demand for smaller size, lighter weight and higher efficiency has constantly increased. The basic principle of the switching regulator is as follows: the switching elements are turned on/off at a high frequency, and the ratio of the on/off periods, that is, the duty ratio, is controlled so that the DC output voltage is kept at a constant level. So-called non-insolated or chopper type switching regulators are of the following three types: the voltage boost type that can provide higher output voltage than the input voltage, the voltage reducing type that can provide a lower output voltage than the input voltage, and a voltage buck-boost that can provide a constant output voltage independent of the input voltage.

In recent years, the battery application voltage range of portable electronic devices has become wider. Applications of floating capacitance have increased for the type of device that can provide a 3 V nominal power supply voltage to the load while the battery voltage changes from 4 V in the fully charged state to 2.5 V. For this type of application, it is preferred that the voltage buck-boost switching regulator that operates as both voltage boosting type and voltage reducing type be adopted.

FIG. 14 is a diagram illustrating the circuit constitution of a typical voltage buck-boost switching regulator of the prior art.

This voltage buck-boost switching regulator is composed of a pair of voltage reducing transistors M1, M2, a pair of voltage boosting transistors M3, M4, inductance coil 100, output capacitor Co, and controller 102.

More specifically, the two terminals of inductance coil 100 are connected to nodes Na, Nb. Here, NMOS transistor M1 is connected between reference voltage terminal (Vss) at ground potential and node Na. PMOS transistor M2 is connected between voltage input terminal 104 and node Na. Also, NMOS transistor M3 is connected between reference voltage terminal (Vss) at ground potential and node Nb, and PMOS transistor M4 is connected between voltage output terminal 105 and node Nb. Output capacitor Co is connected between voltage output terminal 105 and reference voltage terminal (Vss) at ground potential. For example, voltage input terminal 104 is connected to primary battery or secondary battery (not shown in the figure), and voltage output terminal 105 is connected to any load circuit (not shown in the figure).

Under the control of controller 102, when the voltage reducing operation is performed, voltage boosting transistors M3, M4 are kept in a steady state pass node with respect to voltage output terminal 105, that is, PMOS transistor M4 is turned on, NMOS transistor M3 is turned off, and voltage reducing transistors M1, M2 are turned on/off with a variable duty ratio. When the voltage boosting operation is performed, voltage reducing transistors M1, M2 are kept in the steady state through state with respect to voltage input terminal 104, that is, PMOS transistor M2 is turned on, NMOS transistor M1 is turned off, and voltage boosting transistors M3, M4 are turned on/off with a variable duty ratio for the various switching cycles.

Said controller 102 has voltage feedback circuit 106 that feeds back output voltage Vo from voltage output terminal 105 to generate error voltage Verr, and comparison reference wave signal circuit 108 that generates a voltage reducing sawtooth wave signal Vrp1 and voltage boosting sawtooth wave signal Vrp2 with respect to error voltage Verr.

Said voltage feedback circuit 106 operates as follows: output voltage Vo is divided by a constant ratio by voltage dividing resistors 110, 112; divided voltage Vfb is compared with reference voltage Vref by means of error amplifier 114 made of an op amp, and the difference is amplified at a constant amplification rate to generate error voltage Verr. Here, phase compensation circuit 116 for adjusting the frequency transfer function (response characteristics) of the voltage feedback loop is connected to error amplifier 114. Said phase compensation circuit 116 is composed of three capacitors 118, 120, 122 and three resistors 124, 126, 128.

Said comparison reference wave signal circuit 108 consists of the following parts: oscillator 130 that oscillates and outputs clock signal CK at a constant frequency, sawtooth wave generator 132 that generates first sawtooth wave signal Vrp1 synchronized with clock signal CK and having a constant slope and a constant amplitude, and level transforming circuit 134 that increases the voltage level of first sawtooth wave signal Vrp1 by a constant amount corresponding to said amplitude to form second sawtooth wave signal Vrp2.

In addition, controller 102 has the following parts: first comparator 136, which compares error voltage Verr with first sawtooth wave signal Vrp1, and, corresponding to the relationship between them with respect to magnitude, outputs a binary signal as voltage reducing PWM (pulse width modulation) switching signal Ppwm1, and voltage reducing driver 138 that performs switching driving for voltage reducing transistors M1, M2 corresponding to voltage reducing PWM switching signal Vpwn1. Also, there are the following parts: second comparator 140, which compares error voltage Verr with second sawtooth wave signal Vrp2, and, corresponding to the relationship between them in magnitude, outputs a binary signal as voltage boosting PWM switching signal Vpwm2, and voltage boosting driver 142, which performs switching driving for voltage boosting transistors M3, M4 corresponding to voltage boosting PWM switching signal Vpwm2.

FIG. 15 is a waveform diagram illustrating the operation of said voltage buck-boost switching regulator.

When input voltage Vi is higher than output voltage Vo, that is, in the voltage reducing mode, the level of error voltage Verr output from error amplifier 114 is relatively low, and, in each switching cycle defined at clock signal CK, error voltage Verr crosses only first sawtooth wave signal Vrp1 and does not cross second sawtooth wave signal Vrp2.

In this case, during the former period, from the start of each switching cycle to the time when error voltage Verr crosses first sawtooth wave signal Vrp1, Verr>Vrp1, the output of first comparator 136, that is, PWM switching signal Vpwm1, is at the H level, and voltage reducing transistors M1, M2 are in the off and on states, respectively. Then, during the latter period, from the time when error voltage Verr crosses first sawtooth wave signal Vrp1 to end of said switching cycle, Verr<Vrp1, PWM switching signal Vpwm1 is at the L level, and voltage reducing transistors M1, M2 are in the on and off states, respectively. On the other hand, the output of second comparator 140, that is, voltage boosting PWM switching signal Vpwm2 is at the H level throughout the entire period of the switching cycle, and voltage boosting transistors M3, M4 are kept in the off and on states, respectively.

As said input voltage Vi falls, the level of error voltage Verr rises under feedback control, and the proportion of the on time of transistor M2 during each switching cycle, that is, the duty ratio, rises. Here, the level of error voltage Verr does not cross first sawtooth wave signal Vrp1, and the voltage reducing operation stops. As a result, it crosses second sawtooth wave signal Vrp2, and the voltage boosting operation is performed.

In the voltage boosting operating mode, during the former period, from the start of each switching cycle to the time when error voltage Verr crosses second sawtooth wave signal Vrp2, Verr>Vrp2, the output of second comparator 140, that is, voltage boosting PWM switching signal Vpwm2 is at the L level, and voltage boosting transistors M3, M4 are in the on and off states, respectively. Then, during the latter period, from the time when error voltage Verr crosses second sawtooth wave signal Vrp2 to the end of said switching cycle, Verr<Vrp1, voltage boosting PWM switching signal Vpwm2 is at the H level, and voltage boosting transistors M3, M4 are in the off and on states, respectively. On the other hand, the output of first comparator 136, that is, PWM switching signal Vpwm1 is at the H level throughout the entire period of the switching cycle, and voltage boosting transistors M1, M2 are kept in the on and off states, respectively. During the voltage boosting operation, as input voltage Vi falls, under feedback control, the level of error voltage Verr rises, and the on time of transistor M3 during each switching cycle, that is, the duty ratio, increases.

In recent years, there has been greater demand for the voltage buck-boost switching regulators for electronic devices that operate at the power supply voltage obtained by means of DC-DC conversion from Li ion batteries or other secondary batteries. On the other hand, as the application voltage range of said secondary batteries becomes wider, there is a demand for a type of voltage buck-boost switching regulator with stable, high-speed response characteristics and output characteristics that can also handle a high current load. Also, for the voltage buck-boost switching regulator, when the voltage boosting operation is performed, unlike the voltage reducing operation, in the frequency characteristics of the constant-voltage feedback loop, there is a 180° phase log in the frequency characteristics. Consequently, compared with the voltage reducing operation, the operation tends to become more unstable, and a solution is required.

In order to meet said demand, for said voltage buck-boost switching regulator (FIG. 14), the circuit constitution and selection of constants of phase compensation circuit 116 are designed to solve said problems. In the example shown in the figure, phase compensation circuit 116 has three capacitors 118, 120, 122 and three resistors 124, 126, 128, and the voltage feedback circuit is formed with two zeroes and two poles in the frequency transfer characteristics.

However, because the number of circuit elements of phase compensation circuit 116 is increased, not only does the cost increase, but also the order of the frequency transfer function increases, and it becomes quite difficult to set the optimum constants in phase compensation circuit 116 to ensure stable operation over the entire region of the wide output voltage range from voltage reducing to voltage boosting. In order to solve the aforementioned problem, a scheme has been proposed in which individual phase compensation circuits are arranged for the voltage reducing operation and the voltage boosting operation, respectively, so that the constants can be easily set for the individual phase compensation circuits, respectively. However, according to this scheme, the number of the plural phase compensation circuits is increased, so that the circuit scale becomes even larger, and the size and cost of the semiconductor chip becomes much larger, which is undesirable.

SUMMARY OF THE INVENTION

A general object of the present invention is to solve the aforementioned problems of the prior art by providing a voltage buck-boost switching regulator that can perform a stable, high-speed, high-efficiency constant-voltage output operation without using a complicated, large-scale and high-cost phase compensation circuit.

This and other aspects and features are attained in accordance with an aspect of the invention which provides a voltage buck-boost switching regulator characterized by the fact that it has the following parts: a first switching circuit for voltage reducing connected between the voltage input terminal and one terminal of an inductance element; a second switching circuit for voltage boosting connected between the other terminal of said inductance element and the voltage output terminal; an error amplifier that compares the output voltage obtained at said voltage output terminal or the output divided voltage obtained by a resistive voltage divider with a prescribed reference voltage, and amplifies the difference between them at a prescribed amplification rate to generate an error voltage; a current sense circuit that detects the inductance current flowing in said inductance element and generates a current sense signal corresponding to said inductance current; a variable sawtooth wave generator that generates a first variable sawtooth wave signal having a first top peak level and a first bottom peak level corresponding to said error voltage and the first slope corresponding to said output voltage, and a second variable sawtooth wave signal having a second top peak level and a second bottom peak level corresponding at said error voltage and a second slope corresponding to the input voltage input to said voltage input terminal; a first switching controller that compares the voltage level of said current sense signal and the voltage level of said first variable sawtooth wave signal, and controls said first switching circuit corresponding to their magnitude relationship; and a second switching controller that compares the voltage level of said current sense signal and the voltage level of said second variable sawtooth wave signal, and controls said second switching circuit corresponding to their magnitude relationship.

A second feature of the present invention provides a voltage buck-boost switching regulator characterized by the fact that it has the following parts: a first switching circuit for voltage reducing connected between the voltage input terminal and one terminal of an inductance element; a second switching circuit for voltage boosting connected between the other terminal of said inductance element and the voltage output terminal; and a controller, which detects the input voltage input to said voltage input terminal, the output voltage obtained at said voltage output terminal, and the inductance current flowing in said inductance element, and, on the basis of said detected values, said output voltage is held at the desired preset voltage by performing a switching operation at a constant frequency selectively for any one of said first switching circuit and said second switching circuit, and, at the same time, controls the duty ratio during switching operation.

In an aspect, the voltage buck-boost switching regulator has a phase compensation circuit for adjusting the frequency transfer function of the constant-voltage feedback loop with respect to said output voltage.

Corresponding to the inductance current flowing in the inductance element, that is, corresponding to the current mode, the voltage buck-boost switching regulator of the present invention performs either a voltage reducing operation or a voltage boosting operation. With said current mode system, in the frequency characteristics, the secondary poles are divided into two poles, a low frequency pole and a high frequency pole. Consequently, a single integrator can be used to form the phase compensation circuit, and it is possible to output a stable, high-speed constant voltage using an integrator typically consisting of a resistor and a capacitor.

Also, in an aspect, while a transition from voltage reducing mode to voltage boosting mode or a transition from voltage boosting mode to voltage reducing mode can be performed smoothly during the continuous switching operation, in the state in which the input voltage and the output voltage are approximately equal, the switching operation of the voltage reducing switching circuit and the voltage boosting switching circuit is entirely stopped, so that the high efficiency constant-voltage output operation (through operation) can be performed without switching losses.

In an aspect of the present invention, said variable sawtooth wave generator comprises the following parts: an oscillator that generates a clock signal with a constant frequency, a first reference sawtooth wave generator that generates a first reference sawtooth wave signal synchronized with said clock signal and having a first slope proportional to said output voltage; a second reference sawtooth wave generator that generates a second reference sawtooth wave signal synchronized with said clock signal and having a second slope proportional to said input voltage; a first arithmetic and logic unit circuit that performs a first arithmetic and logic operation for said error voltage and said first reference sawtooth wave signal to generate said first variable sawtooth wave signal; and a second arithmetic and logic unit circuit that performs a second arithmetic and logic operation for said error voltage, said input voltage, said output voltage, and said second reference sawtooth wave signal to generate the second variable sawtooth wave signal.

In this case, said first arithmetic and logic unit circuit has a first subtracter that subtracts said first reference sawtooth wave signal from said error voltage to generate a first difference signal representing their difference, and it outputs said first difference signal as said first variable sawtooth wave signal. Also, the following scheme may be adopted: said second arithmetic and logic unit circuit has a first adder that adds said input voltage and said output voltage to generate a first sum signal representing their sum, a multiplier that multiplies a prescribed constant to said first sum signal to generate a product signal representing their product, and a second adder that adds said second difference signal and said second reference sawtooth wave signal to generate a second sum signal representing their sum, and said second sum signal is output as said second variable sawtooth wave signal.

In an aspect of the present invention, the slope of said first variable sawtooth wave signal is negative, the slope of said second variable sawtooth wave signal is positive, and the first bottom peak level of said first variable sawtooth wave signal is equal or approximately equal to the second top peak level of said second variable sawtooth wave signal.

In an aspect of the present invention, said current sense circuit is connected to said voltage input terminal, said voltage output terminal and the two terminals of said inductance element, and for example, a current mirror circuit is used to detect the inductance current. Said current sense signal has a voltage level proportional to the instantaneous value of said inductance current.

In an aspect of the present invention, said first switching circuit has a first switching element connected between said reference voltage terminal and one terminal of said inductance element, and a second switching element connected between said voltage input terminal and said one end of said inductance element; said first switching controller performs a switching operation of said first switching circuit in said first switching circuit when the voltage level of said current sense signal crosses the voltage level of said first variable sawtooth wave signal; during the former period, from the start of each switching cycle to the time when the voltage level of said current sense signal crosses the voltage level of said first variable sawtooth wave signal, said first switching element is turned off; during the latter period, from the time when the voltage level of said current sense signal crosses the voltage level of said first variable sawtooth wave signal to the end of said switching cycle, said first switching element is turned on, and said second switching element is turned off.

Also, in an aspect, said second switching circuit has a third switching element connected between said reference voltage terminal and said other terminal of said inductance element and a fourth switching element connected between said voltage output terminal and said other terminal of said inductance element. Said second switching controller performs a switching operation for said second switching circuit when the voltage level of said current sense signal crosses the voltage level of said second variable sawtooth wave signal; during the former period, from the start of each switching cycle to the time when the voltage level of said current sense signal crosses the voltage level of said second variable sawtooth wave signal, said third switching element is turned off and said fourth switching element is turned on; and, during the latter period, from the time when the voltage level of said current sense signal crosses the voltage level of said second variable sawtooth wave signal to end of said switching cycle, said third switching element is turned on and said fourth switching element is turned off.

REFERENCE NUMERALS AND SYMBOLS AS SHOWN IN THE DRAWINGS

Figure 10:
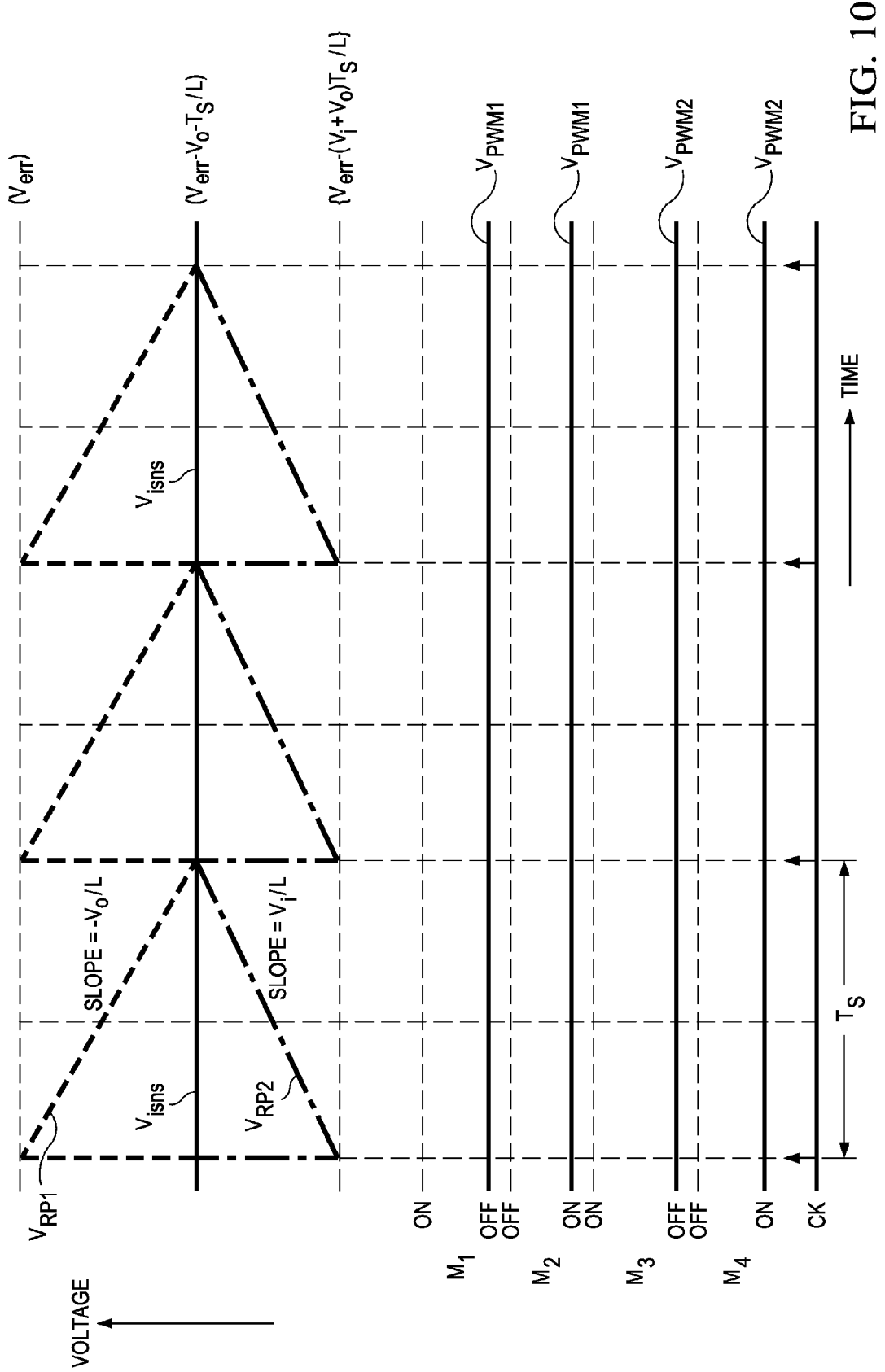
FIG. 10 is a waveform diagram illustrating the waveforms of the various parts when the pass operation is performed by said voltage buck-boost switching regulator.

In the figures 10 represents an inductance coil, 12 represents a controller, 14 represents a voltage input terminal, 15 represents a voltage output terminal, 16 represents a voltage reducing driver, 18 represents a voltage boosting driver, 20 represents an output voltage feedback circuit, 22 represents an inductor current sense circuit, 24 represents a variable sawtooth wave signal generator, 26, 28 represent switching controllers, 30 represents a voltage divider circuit, 32 represents an error amplifier, 34 represents a phase compensation circuit, 44 represents an oscillator, 46, 48 represent primary sawtooth wave generators, 50 represents an analog arithmetic and logic unit circuit, 62, 66 represent comparators, 64, 68 represent SR latch circuits, M1, M2 represent voltage reducing transistors, M3, M4 represent voltage boosting transistors.

DESCRIPTION OF THE EMBODIMENTS

The voltage buck-boost switching regulator of the present invention with said constitution and operation makes it possible to output a stable, high-speed, high-efficiency constant voltage without a complicated, large-scale, and high-cost phase compensation circuit.

In the following, an explanation will be given regarding preferred embodiments of the present invention with reference to FIGS. 1-13.

Figure 1:
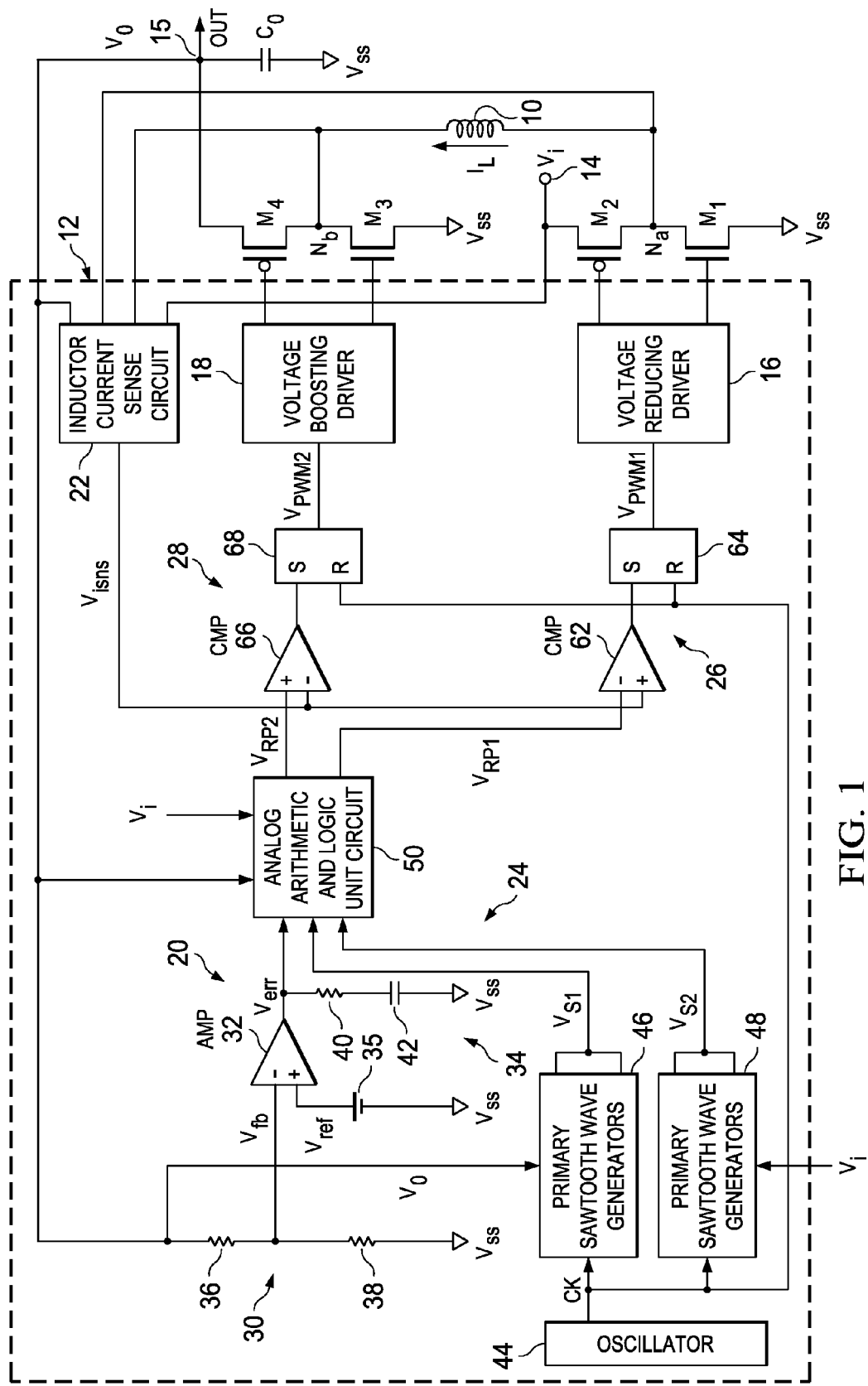
FIG. 1 is a circuit diagram illustrating the circuit constitution of the voltage buck-boost switching regulator in an embodiment of the present invention.

FIG. 1 is a diagram illustrating the constitution of the circuit of the voltage buck-boost switching regulator in an embodiment of the present invention.

This voltage buck-boost switching regulator has a pair of voltage reducing transistors M1, M2, a pair of voltage boosting transistors M3, M4, inductance coil 10, output capacitor Co and controller 12.

More specifically, the two terminals of inductance coil 10 are connected to nodes Na, Nb, respectively. Then, NMOS transistor M1 is connected between reference voltage terminal (Vss) at ground potential and node Na, and PMOS transistor M2 is connected between voltage input terminal 14 and node Na. In addition, NMOS transistor M3 is connected between reference voltage terminal (Vss) at ground potential and node Nb, and PMOS transistor M4 is connected between voltage output terminal 15 and node Nb. Output capacitor Co is connected between voltage output terminal 15 and reference voltage terminal (Vss) at ground potential. For example, voltage input terminal 14 is connected to a primary battery or a secondary battery (not shown in the figure), and voltage output terminal 15 is connected to any load circuit (not shown in the figure).

This voltage buck-boost switching regulator has an appropriate constitution that allows automatic selection at will from the following modes corresponding to the voltage level of input voltage Vi input from the primary battery or secondary battery to voltage input terminal 14: voltage reducing mode in which output voltage Vo, which is less than input voltage Vi, is generated, pass mode in which input voltage Vi is output as the output voltage Vo as is, and voltage buck-boost mode in which output voltage Vo, which is greater than input voltage Vi, is generated.

Said controller 12 has voltage reducing driver 16 and voltage boosting driver 18. In the voltage reducing mode, voltage boosting transistors M3, M4 are kept in steady state off and on states, respectively, by means of voltage boosting driver 18, and voltage reducing transistors M1, M2 are turned on/off with a variable duty ratio for each switching cycle by means of voltage reducing driver 16. In the pass mode, by means of voltage reducing driver 16, voltage reducing transistors M1, M2 are kept in the steady-state off and on states, respectively, and, at the same time, by means of voltage boosting driver 18, voltage boosting transistors M3, M4 are kept in the steady-state off and on states, respectively. Here, in the voltage boosting operating mode, by means of voltage reducing driver 16, voltage reducing transistors M1, M2 are kept in the steady-state off and on states, respectively, and, by means of voltage boosting driver 18, voltage boosting transistors M3, M4 are kept in the steady-state on and off states, respectively, with a variable duty ratio for each switching cycle.

Said controller 12 has output voltage feedback circuit 20, inductor current sense circuit 22, variable sawtooth wave generator 24, and switching controllers 26, 28 so that said constant-voltage PWM control can be performed for said voltage reducing transistors M1, M2 and voltage boosting transistors M3, M4.

Said output voltage feedback circuit 20 consists of voltage divider circuit 30, error amplifier 32, and phase compensation circuit 34. Said voltage divider circuit 30 consists of resistors 36, 38, and it divides output voltage Vo from voltage output terminal 15 at a constant ratio corresponding to the resistance values of said resistors 36, 38. Said error amplifier 32 is made up of an op amp. It compares divided voltage Vfb from voltage divider circuit 30 with the constant reference voltage Vref from reference voltage generator 35, amplifies the difference between them by a constant amplification rate to generate error voltage Verr. Said phase compensation circuit 34 consists of resistor 40 and capacitor 42 connected in series between the output terminal of error amplifier 32 and reference voltage terminal (Vss) at ground potential, and it is used for removing poles from the frequency transfer function to adjust the frequency transfer function (for stabilization) of the constant-voltage feedback loop.

Said variable sawtooth wave signal generator 24 comprises oscillator 44, primary sawtooth wave generators 46, 48, and analog arithmetic and logic unit circuit 50. In the steady-state (equalization state), in which input voltage Vi and output voltage Vo do not vary, as shown schematically in FIG. 5, first variable sawtooth wave signal (secondary sawtooth wave signal) VRP1 having a negative slope (−Vo/L) proportional to output voltage Vo and second variable sawtooth wave signal (secondary sawtooth wave signal) VRP2 having a positive slope (Vi/L) proportional to input voltage Vi are output. Here, coefficient L is the inductance of inductance coil 10. Also, the slopes of first variable sawtooth wave signal VRP1 and second variable sawtooth wave signal VRP2 vary corresponding to variation in input voltage Vi and output voltage Vo.

Said oscillator 44 generates clock signal CK at a constant frequency that defines switching cycle Ts. On one side, clock signal CK from oscillator 44 and output voltage Vo from voltage output terminal 15 are input to primary sawtooth wave generator 46, which generates primary sawtooth wave signal Vs1 having a positive slope (Vo/L) proportional to output voltage Vo. On the other side, clock signal CK from oscillator 44 and input voltage Vi from voltage input terminal 14 input to primary sawtooth wave generator 48, which generates second primary sawtooth wave signal Vs2 having a positive slope (Vi/L).

Figure 2:
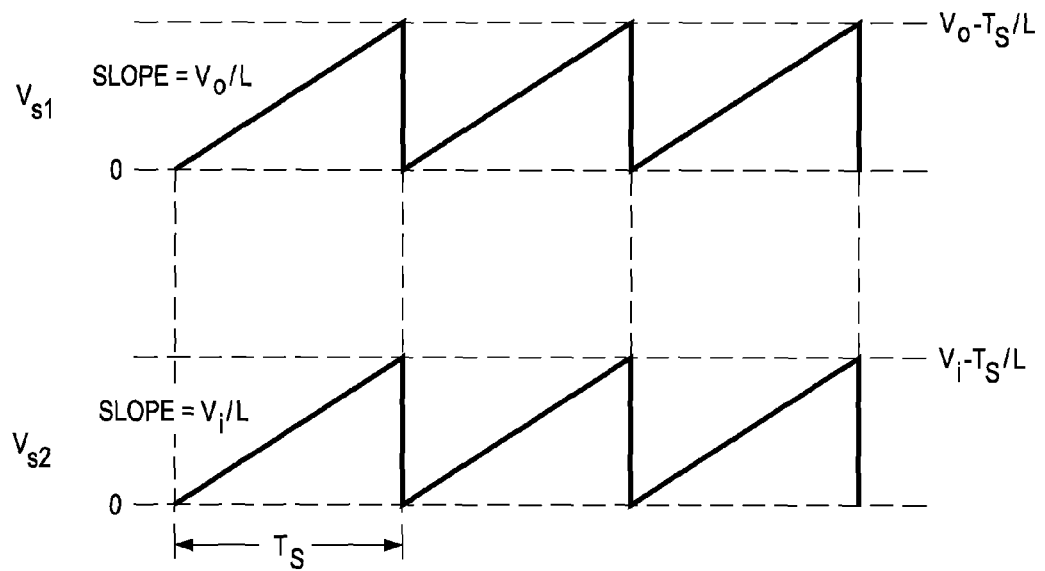
FIG. 2 is a waveform diagram illustrating the waveforms of the first and second primary sawtooth wave signals in said voltage buck-boost switching regulator.

FIG. 2 is a diagram illustrating the waveforms of primary sawtooth wave signal Vs1 and second primary sawtooth wave signal Vs2. Period Ts of said two signals Vs1, Vs2 is in agreement with the period of clock signal CK, and it corresponds to the switching cycle of PWM control. The peak levels of said two signals Vs1, Vs2 are Vo*Ts/L, Vi*Ts/L, respectively.

Figure 3:
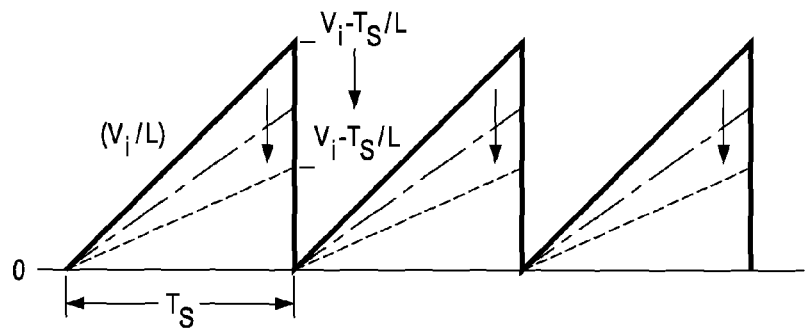
FIG. 3 is a diagram illustrating the state of variation with time of the slope of the second primary sawtooth wave signal corresponding to decrease in the input voltage in said voltage buck-boost switching regulator.

Here, as shown in FIG. 3, when input voltage Vi falls with time due to the consumption of the battery (primary battery or secondary battery), for said second primary sawtooth wave signal Vs2, slope (Vi/L) and peak level (Vi*Ts/L) decrease or fall with time. On the other hand, first primary sawtooth wave signal Vs1 is maintained near the nominal value independently of variations in output voltage Vo and input voltage Vi. Consequently, both slope (Vo/L) and peak level P1 (Vo*Ts/T) are kept stable with time, that is, with little change. This is a characteristic feature.

Error voltage Verr from error amplifier 32, primary sawtooth wave signals Vs1, Vs2 from primary sawtooth wave generators 46, 48, input voltage Vi from voltage input terminal 14 and output voltage Vo from voltage output terminal 15 are input to said analog arithmetic and logic unit circuit 50, which performs the prescribed analog arithmetic and logic operations on each input signal to generate said first variable sawtooth wave signal VPR1 and said second variable sawtooth wave signal VPR2 (secondary sawtooth wave signals).

Figure 4:
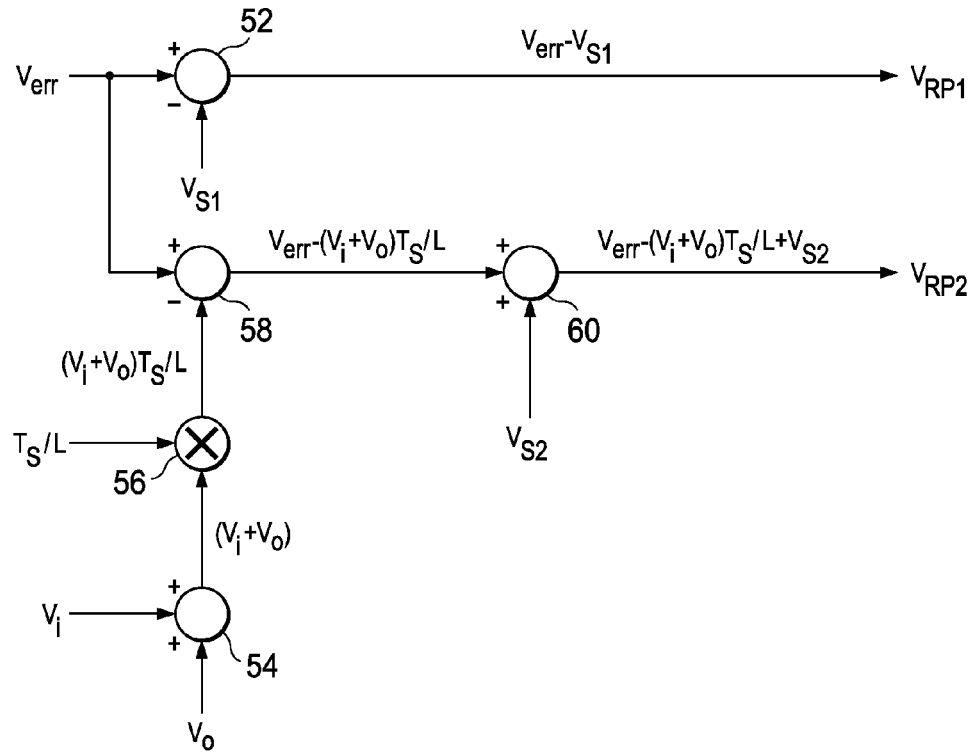
FIG. 4 is a block diagram illustrating the circuit constitution of the analog arithmetic and logic unit circuit during said voltage buck-boost switching regulator.

FIG. 4 is a diagram illustrating an example of the constitution of analog arithmetic and logic unit circuit 50. This analog arithmetic and logic unit circuit 50 uses subtracter 52 to perform analog arithmetic and logic operations to find the difference between error voltage Verr and first primary sawtooth wave signal Vs1, and it outputs difference signal (Verr−Vs1) as first variable sawtooth wave signal VRP1. Here, adder 54 performs analog arithmetic and logic operations to find the sum of input voltage Vi and output voltage Vo, multiplier 56 performs arithmetic and logic operations to find the product of sum signal (Vi+Vo) and constant Ts/L, subtracter 58 performs analog operation to find the difference between error voltage Verr and product signal (Vi+Vo)*Ts/L, adder 54 performs analog arithmetic and logic operation for the sum of difference signal {Verr−(Vi+Vo)*Ts/L} and primary sawtooth wave signal Vs2 and outputs the sum signal [(Verr−(Vi+Vo)*Ts/L)+Vs2] as second variable sawtooth wave signal VRP2.

Figure 5:
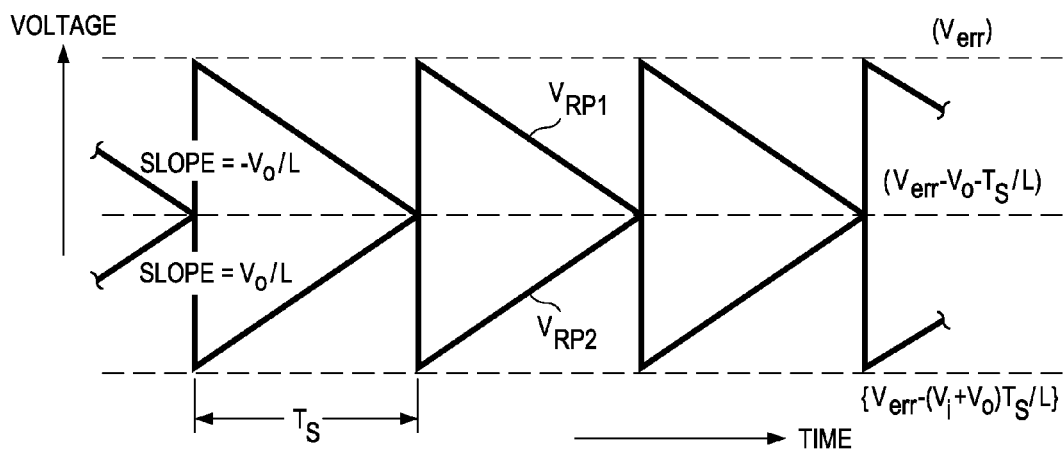
FIG. 5 is a waveform diagram illustrating the waveforms of the first and second variable sawtooth wave signals in said voltage buck-boost switching regulator.

FIG. 5 shows the waveforms of first variable sawtooth wave signal VRP1 and second variable sawtooth wave signal VRP2. Said two signals VRP1 and VRP2 are synchronized with switching cycle Ts. When input voltage Vi and output voltage Vo are in the steady state, i.e. without variations, said first variable sawtooth wave signal VRP1 has slope −Vo/L, top peak level Verr, and bottom peak level (Verr−Vo*Ts/L). When input voltage Vi and output voltage Vo are in the steady-state, i.e. without variations, said second variable sawtooth wave signal VRP2 has slope Vi/L, a top peak level of difference signal (Verr−Vo*Ts/L), and a bottom peak level of {Verr−(Vi+Vo)*Ts/L}.

As shown in FIG. 5, at the end of each clock cycle, both the bottom peak level of first variable sawtooth wave signal VRP1 and the top peak level of second variable sawtooth wave signal VRP2 are (Verr−Vo*Ts/L), and are in good agreement with each other.

Figure 6:
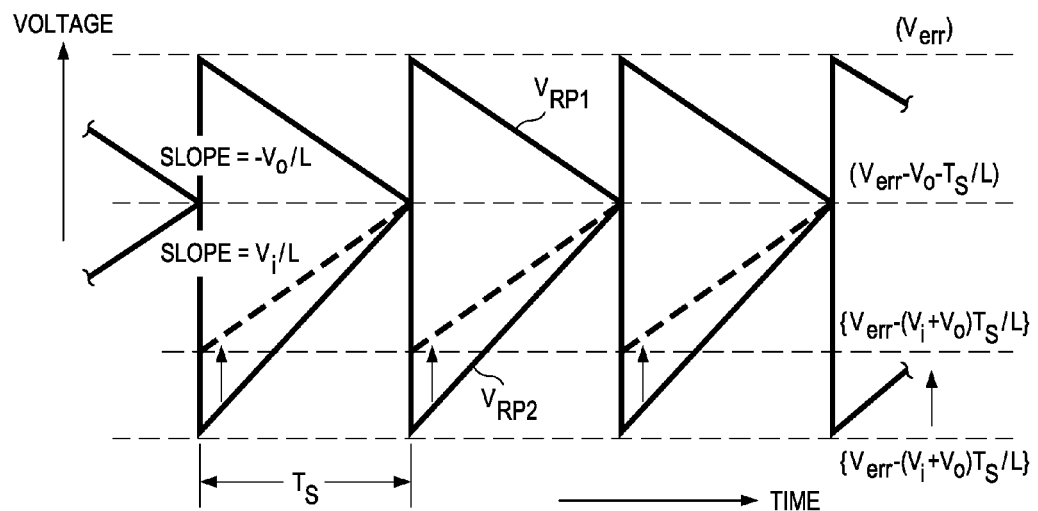
FIG. 6 is a diagram illustrating the state of variation with time of the slope and the bottom peak level of the second variable sawtooth wave signal corresponding to decrease in the input voltage in said voltage buck-boost switching regulator.

Also, first variable sawtooth wave signal VRP1 and second variable sawtooth wave signal VRP2 have error voltage Verr as the common factor or reference factor for the peak levels. Consequently, even when error voltage Verr varies, the variations in the top peak level and bottom peak level of two signals VRP1 and VRP2 are the same based on the variation in said error voltage. Usually, as input voltage Vi falls due to consumption of the battery (primary battery or secondary battery), error voltage Verr gradually rises due to feedback control. In this case, for second variable sawtooth wave signal VPR2, as input voltage Vi decreases, as shown in FIG. 6, slope (Vi/L) gradually decreases, while bottom peak level {Verr−(Vi+Vo)*Ts/L} gradually rises. As explained above, because first variable sawtooth wave signal VRP1 and second variable sawtooth wave signal VRP2, as well as error voltage Verr, are used as reference factors, in consideration of the variation in error voltage Verr accompanying variations in output voltage Vo, the slopes of first variable sawtooth wave signal VRP1 and second variable sawtooth wave signal VRP2 vary corresponding to said variation.

Said first variable sawtooth wave signal VRP1 and second variable sawtooth wave signal VRP2 generated by said variable sawtooth wave signal generator 24 are sent to first switching controller 26 and second switching controller 28, respectively.

Said inductor current sense circuit 22 is connected to the two terminals of inductance coil 10 as well as voltage input terminal 14 and voltage output terminal 15. For example, it uses a current mirror circuit (not shown in the figure) to detect inductor current IL flowing in inductance coil 10, and it outputs a voltage signal proportional to the instantaneous value of inductor current IL as current sense signal Visns. This current sense signal Visns is sent to first switching controller 26 and second switching controller 28.

Said first switching controller 26 consists of comparator 62 and SR latch circuit 64 (flip-flop circuit). Said comparator 62 has current sense signal Visns input to its positive-side input terminal (+) and has first variable sawtooth wave signal VRP1 input to its negative-side input terminal (−). It compares the voltage levels of the two input signals Visns, VRP1. If Visns<VRP1, it generates an output signal with logic value L. If Visns≧VRP1, it generates an output signal with logic value of H. Clock signal CK from oscillator 44 is input to reset input terminal (R) of said SR latch circuit 64, and the output signal of comparator 62 is input to set input terminal (S). The output signal of SR latch circuit 64 is sent as first PWM switching signal Vpwm1 to voltage reducing driver 16.

Said second switching controller 28 consists of comparator 66 and SR latch circuit 68. Current sense signal Visns is input to the negative-side input terminal (−) of said comparator 66, and, at the same time, second variable sawtooth wave signal VRP2 is input to the positive-side input terminal (+) of said comparator. The comparator then compares the voltage levels of the two input signals Visns, VRP2. If Visns>VRP2, it generates an output signal with logic value L. If Visns<VRP2, it generates an output signal with logic value of H. Clock signal CK from oscillator 44 is input to reset input terminal (R) of said SR latch circuit 68, and the output signal of comparator 66 is input to the set input terminal (S) of said comparator. The output signal of SR latch circuit 68 is sent as second PWM switching signal Vpwm2 to voltage boosting driver 18.

The operation of the voltage buck-boost switching regulator of this embodiment will be explained with reference to FIGS. 7-11.

Figure 7:
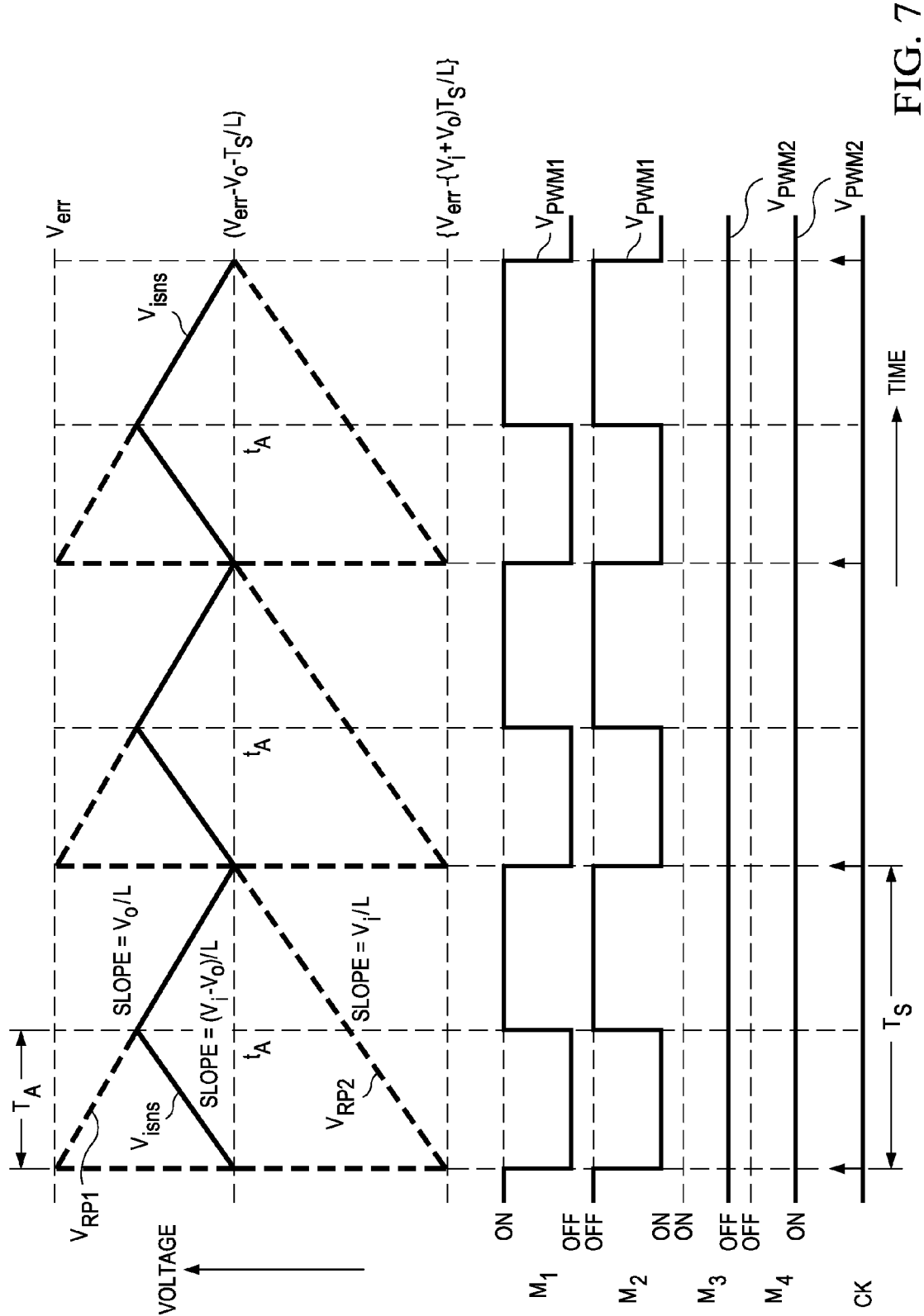
FIG. 7 is a waveform diagram illustrating the waveforms of the various parts when the voltage reducing operation is performed by said voltage buck-boost switching regulator.

FIG. 7 is a diagram illustrating the waveforms of the various portions when said voltage buck-boost switching regulator performs voltage reducing operation. With the rise of clock signal CK, that is, at the start of the switching cycle, said SR latch circuits 64, 68 of first switching controller 26 and second switching controller 28 are reset, respectively, and first and second PWM switching signal VPWM1, VPWM2 are forced to be reset at the L level. As a result, said voltage reducing transistors M1, M2 have signals M1 off and M2, on respectively, and voltage boosting transistors M3, M4 have signals M3 off and M4 on, respectively. Current sense signal Visns has a value corresponding to the initial value of inductor current IL, that is, both the bottom peak level of first variable sawtooth wave signal VRP1 and the top peak level of second variable sawtooth wave signal VRP2 take the value of the reference level (Verr−Vo*Ts/L).

When input voltage Vi is higher than output voltage Vo, transistors M2, M4 turn on simultaneously, the current of inductor current IL flowing in inductance coil 10 increases at a rate of (Vi−Vo)/L, and the voltage level of current sense signal Visns also rises linearly with a slope of (Vi−Vo)/L.

In this way, during said switching cycle, timing tA, when the voltage level of current sense signal Visns that rises with a positive slope (Vi−Vo)/L from reference level (Verr−Vo*Ts/L), reliably agrees with, that is, crosses, the voltage level of first variable sawtooth wave signal VRP1, which decreases with a negative slope Vo/L from top peak level (Verr). When said timing tA arrives, under the control of first switching controller 26, the output signal of comparator 62 is at the H level, and SR latch circuit 64 is set, and first PWM switching signal Vpwm1 changes from the L level to H level, and voltage reducing transistors M1, M2 are turned on with signal M1 and turned off with signal M2, respectively.

When transistor M1 is on and transistor M2 is off, the terminal on the side of node Na of inductance coil 10 is connected to reference voltage terminal (Vss) at ground potential, and inductor current IL flowing in inductance coil 10 decreases at rate −Vo/L, and current sense signal Visns also falls with slope −Vo/L together with first variable sawtooth wave signal VRP1 (superimposed).

On the other hand, under the control of second switching controller 28, with the rising edge of clock signal CK, SR latch circuit 68 is reset, and the output signal of comparator 66 is kept at the L level as is. Consequently, voltage boosting transistors M3, M4 are in the state in which M3 is kept off and M4 is kept on.

In this way, at the end of said switching cycle, current sense signal Visns returns to reference level (Verr−Vo*Ts/L) together with first variable sawtooth wave signal VRP1.

Immediately thereafter, as the next clock signal CK rises, SR latch circuits 64, 68 are reset, and the same operation as described above is repeated from the beginning.

Instead of input voltage Vi gradually falling due to the consumption of the battery with time, output voltage Vo is kept stable near the nominal value. On the other hand, from the standpoint of instantaneous variation, although input voltage Vi is generally held constant, output voltage Vo undergoes minor variations.

Figure 8:
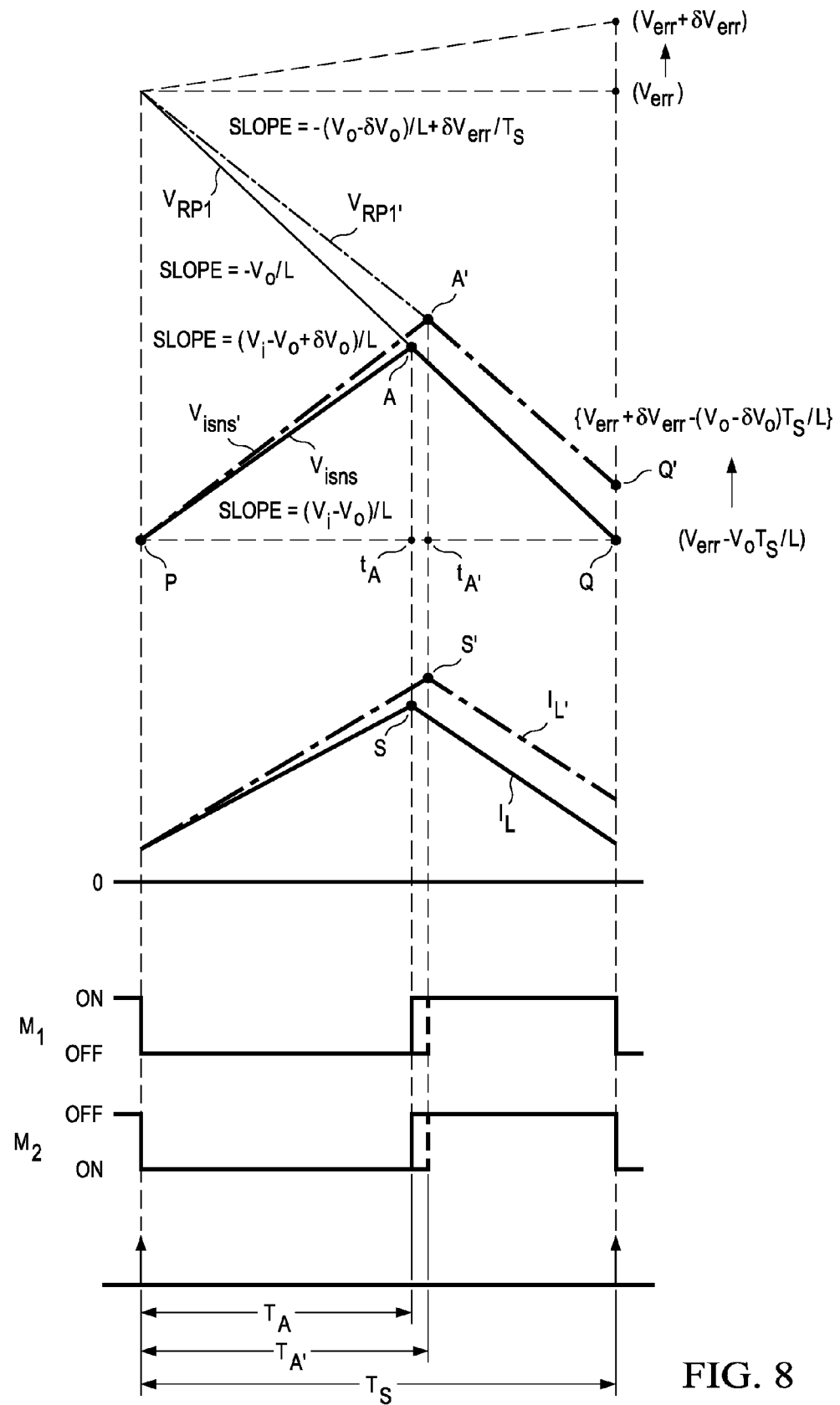
FIG. 8 is a diagram illustrating the state when the waveforms of the various parts change corresponding to decrease in the input voltage in the voltage reducing operation.

FIG. 8 is a diagram illustrating the instantaneous operation of the voltage reducing mode in units of one cycle. In the example shown in the figure, the waveforms of the various parts when output voltage Vo falls by δVo (where, δVo>0 as the load current rises) are shown. Here, when output voltage Vo changes by δVo, in response to said change, error voltage Verr also changes by δVerr. However, the relationship between δVo and δVerr is δVo<<δVerr. This is because said error voltage Verr is obtained by amplifying the difference between divided voltage Vfb and reference voltage Vref by error amplifier 32.

When output voltage Vo is constant (steady state), there is no change in error voltage Verr, and, as shown in the figure, the top peak level of first variable sawtooth wave signal VRP1 is Verr as is, and its falling slope is −Vo/L. On the other hand, the rising slope of current sense signal Visns is (Vi−Vo)/L, and first variable sawtooth wave signal VRP1 and current sense signal Visns intersect at point A, as shown in the figure, so that period TA until point A in 1 cycle defines the on/off timing of transistors M1, M2. The waveform of current sense signal Visns corresponds to that of inductor current IL, and inductor current IL rises linearly until point A and then falls linearly after point A.

Consider the case when the output voltage Vo falls and error voltage Verr rises by δVerr during 1 cycle. In this case, as shown in the figure, the top peak level of first variable sawtooth wave signal VPR1' changes from Verr to Verr+δVerr during 1 cycle, and the bottom peak level changes from (Verr−Vo*Ts/L) (point Q) to {Verr+δVerr−(Vo−δVo)·Ts/L} (point Q'). Accompanying this, the slope of the decrease of first variable sawtooth wave signal VRP1' is changed to −(Vo−Vo)/L+δVerr/Ts, and the slope of the increase of current sense signal Visns' is (Vi−Vo+δVo)/L, and first variable sawtooth wave signal VRP1' and current sense signal Visns' intersect at point A'. As can be seen from the figure, on the time axis, point A' shifts to the righthand side from point A, and the on time of transistor M2 becomes longer by this amount of shift (TA'−TA), and inductor current IL' increases.

In this way, as output voltage Vo falls by δVo, the on time of transistor M2 during 1 cycle, the inductor current during 1 cycle and the current fed to output capacitor Co increase. Consequently, feedback control is performed so that the output voltage returns to Vo.

When output voltage Vo rises by δVo, the direction of change in the various parts becomes opposite to the aforementioned direction, and feedback control is performed so that the output voltage falls by δVo.

Figure 9:
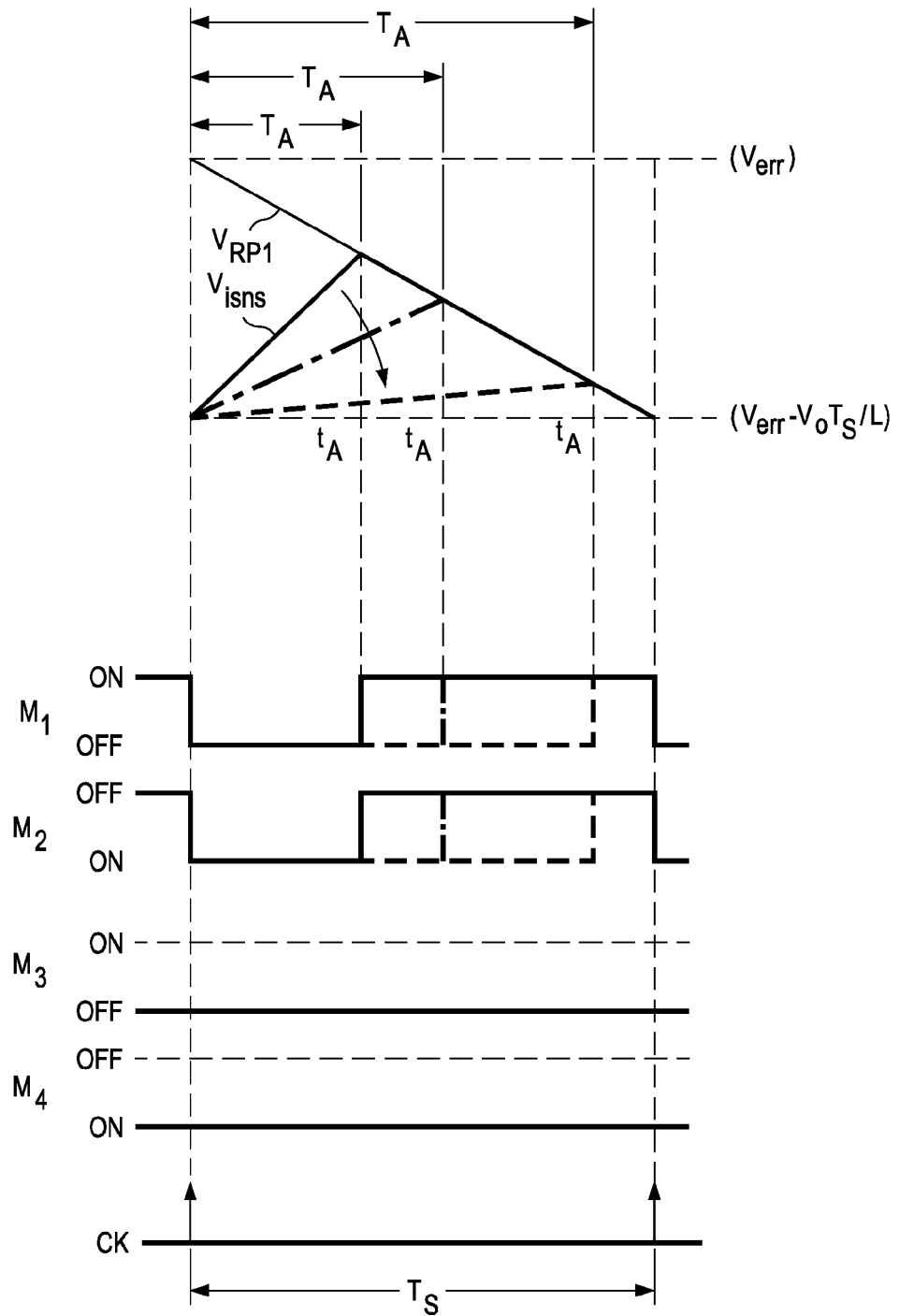
FIG. 9 is a diagram illustrating variation in the waveforms of the various parts when the output voltage instantly varies in the voltage reducing operation.

As shown in FIG. 9, as input voltage Vi falls with time due to the consumption of the battery, immediately after the start of the switching cycle, the slope of rise of the voltage level of current sense signal Visns, (Vi−Vo)/L, decreases. Accompanying this, time TA (on time of transistor M2) until it crosses first variable sawtooth wave signal VRP1 becomes longer. Here, when input voltage Vi falls to the nominal value of output voltage Vo, the slope of current sense signal Visns, (Vi−Vo)/L, is zero, To=Ts, and the duty ratio becomes 100%. At this time, the operating mode changes from the voltage reducing mode to the pass mode.

FIG. 10 is a diagram illustrating the waveforms of the various parts in the pass operating mode. In the through operating mode, as in the voltage reducing mode, at the rising edge of clock signal CK, SR latch circuits 64, 68 of switching controllers 26, 28 are reset, voltage reducing transistors M1, M2 have signals M1 off and M2 on, voltage boosting transistors M3, M4 have signals M3 off and M4 on. Here, current sense signal Visns becomes the initial value of (Verr−Vo*Ts/L).

However, when Vi=Vo, even when transistors M2, M4 are turned on at the same time, inductor current IL flowing in inductance coil 10 still is in agreement with the load current, there is no increase or decrease, and, while the slope is zero, current sense signal Visns maintains the voltage level of the initial value. Consequently, while current sense signal Visns does not cross first variable sawtooth wave signal VRP1 (also does not cross second variable sawtooth wave signal VRP2), the period of the switching cycle comes to an end.

In this way, while the state of Vi=Vo is maintained, voltage reducing transistors M1, M2 have signals M1 off and M2 on, voltage boosting transistors M3, M4 have signals M3 off and M4 on maintained. Here, when input voltage Vi becomes lower than the nominal value of output voltage Vo, the operating mode changes from the pass mode to the voltage boosting mode.

Figure 11:
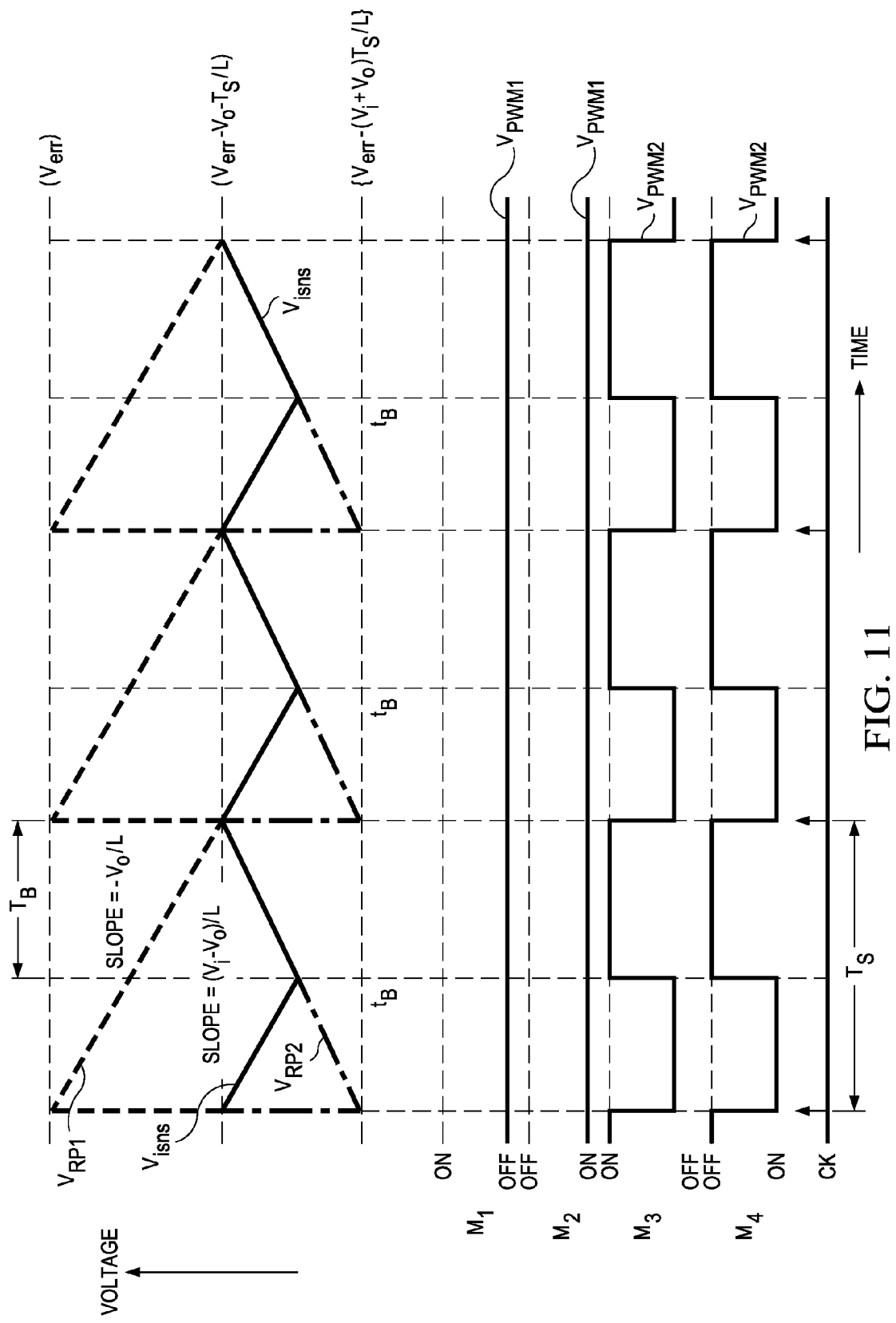
FIG. 11 is a waveform diagram illustrating the waveforms of the various parts when the voltage boosting operation is performed in said voltage buck-boost switching regulator.

FIG. 11 shows the waveforms of the various parts when the voltage boosting operation is performed in this voltage buck-boost switching regulator. Even in the voltage boosting operating mode, the initial state when the switching cycle is started becomes the same for both the voltage reducing mode and the pass mode of operation. That is, at the rising edge of clock signal CK, SR latch circuits 64, 68 are reset, voltage reducing transistors M1, M2 have signals M1 off and M2 on, and voltage boosting transistors M3, M4 have signals M3 off and M4 on. Current sense signal Visns becomes the initial value of (Verr−Vo*Ts/L). However, when both transistors M2, M4 are turned on at the same time, the voltages at the two terminals of inductance coil 10 (Vi, Vo), have the relationship of Vi<Vo. Consequently, inductor current IL decreases at the variation rate of (Vi−Vo)/L, and the voltage level of current sense signal Visns also decreases with a negative slope of (Vi−Vo)/L.

In this way, during said switching cycle, timing tB when the voltage level of current sense signal Visns that falls with a negative slope of (Vi−Vo)/L from reference level (Verr−Vo*Ts/L) agrees with, that is, crosses, the voltage level of second variable sawtooth wave signal VRP2 that increases with a positive slope of Vo/L from bottom peak level {Verr−(Vi+Vo)*Ts/L} will reliably take place. When said timing tB arrives, under the control of second switching controller 28, the output signal of comparator 66 becomes H level, and SR latch circuit 68 is set, and second PWM switching signal Vpwm2 changes from the L level to H level, and voltage boosting transistors M3, M4 have signals M3 on and M4 off.

When signals M3 is on and M4 is off, the terminal on the side of node Nb of inductance coil 10 is connected to reference voltage terminal (Vss) at ground potential, and inductor current IL flowing in inductance coil 10 increases at the variation rate of Vo/L, and current sense signal Visns also increases with a slope of Vo/L together with second variable sawtooth wave signal VRP2 (superimposed).

Under the control of first switching controller 26, on the other hand, at the rising edge of clock signal CK, SR latch circuit 64 is reset, and the output signal of comparator 62 is kept at the L level as is without change. Consequently, for voltage reducing transistors M1 and M2, one has the state in which M3 is kept off, while M2 is kept on.

In this way, at the end of said switching cycle, current sense signal Visns returns to reference level (Verr−Vo*Ts/L) together with second variable sawtooth wave signal VRP2. Immediately thereafter, as the next clock signal CK rises, SR latch circuits 64, 68 are reset, and the same operation as described above is repeated from the beginning.

Figure 12:
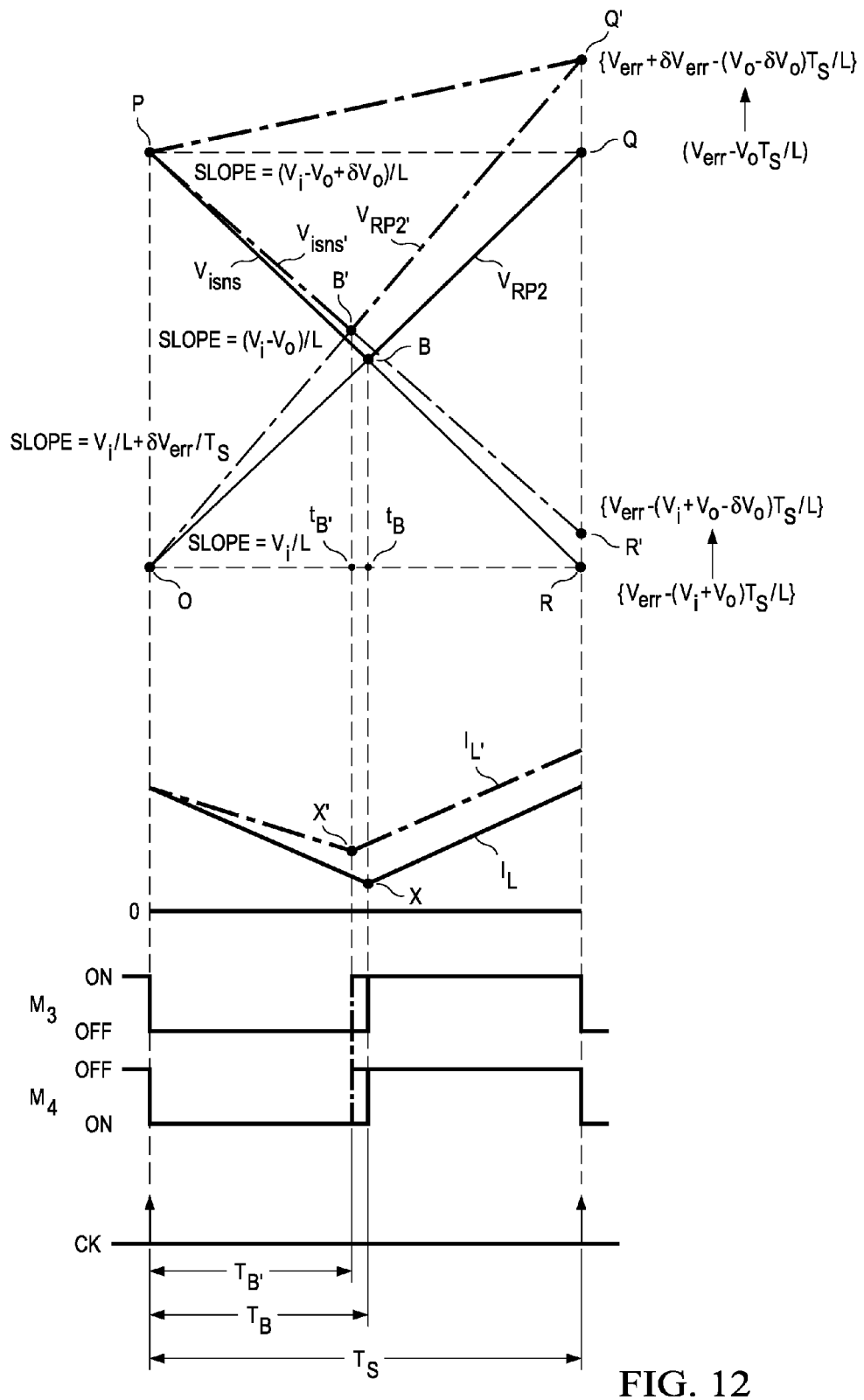
FIG. 12 is a diagram illustrating variation in the waveforms of the various parts when the output voltage varies instantly in the voltage boosting operation.

FIG. 12 is a diagram illustrating the instantaneous operation of the voltage boosting mode in units of one cycle. In the example shown in the figure, the waveforms of the various parts when the load current rises and the output voltage Vo falls by δVo (where, δVo>0) are shown.

When output voltage Vo is constant (steady state), there is no change in error voltage Verr, and, as shown in the figure, the top peak level of second variable sawtooth wave signal VRP2 is (Verr−Vo*Ts/L) as is, and its rising slope is Vi/L. On the other hand, the falling slope of current sense signal Visns is (Vi−Vo)/L, and second variable sawtooth wave signal VRP2 and current sense signal Visns intersect at point B shown in the figure, so that period TB until point B in 1 cycle defines the on/off timing of transistors M3, M4. The waveform of current sense signal Visns corresponds to that of inductor current IL, and inductor current IL falls linearly until point B, and then rises linearly after point B.

Consider the case in which the output voltage Vo falls and error voltage Verr rises by δVerr during 1 cycle. In this case, as shown in the figure, the top peak level of second variable sawtooth wave signal VPR2' changes from (Verr−Vo*Ts/L) (point Q) to {Verr+δVerr−(Vo−δVo)·Ts/L} (point Q') during 1 cycle, and the bottom peak level changes from {Verr−(Vi+Vo)·Ts/L} (point R) to {Verr−δVerr−(Vi+Vo−δVo)·Ts/L} (point R'). Accompanying this, the slope of decrease of second variable sawtooth wave signal VRP2' is changed to Vi/L+δVerr/Ts, and the slope of decrease of current sense signal Visns' becomes (Vi−Vo+δVo)/L, and second variable sawtooth wave signal VRP2' and current sense signal Visns' intersect at point B'. As can be seen from the figure, on the time axis, point B' shifts to the lefthand side from point B, and the on time of transistor M4 becomes shorter by this shift quantity of (TB'−TB), and inductor current IL' increases.

In this way, even in the voltage boosting mode of operation, when output voltage Vo falls by δVo, the on time of transistor M4 during 1 cycle becomes shorter, the inductor current in 1 cycle rises, and the current fed to output capacitor Co rises correspondingly. Consequently, feedback control is made to have the output voltage return to Vo.

When output voltage Vo rises by δVo, the direction of change in each part is reversed so that it is opposite the aforementioned direction, and feedback control is performed so that the output voltage falls by δVo.

Figure 13:
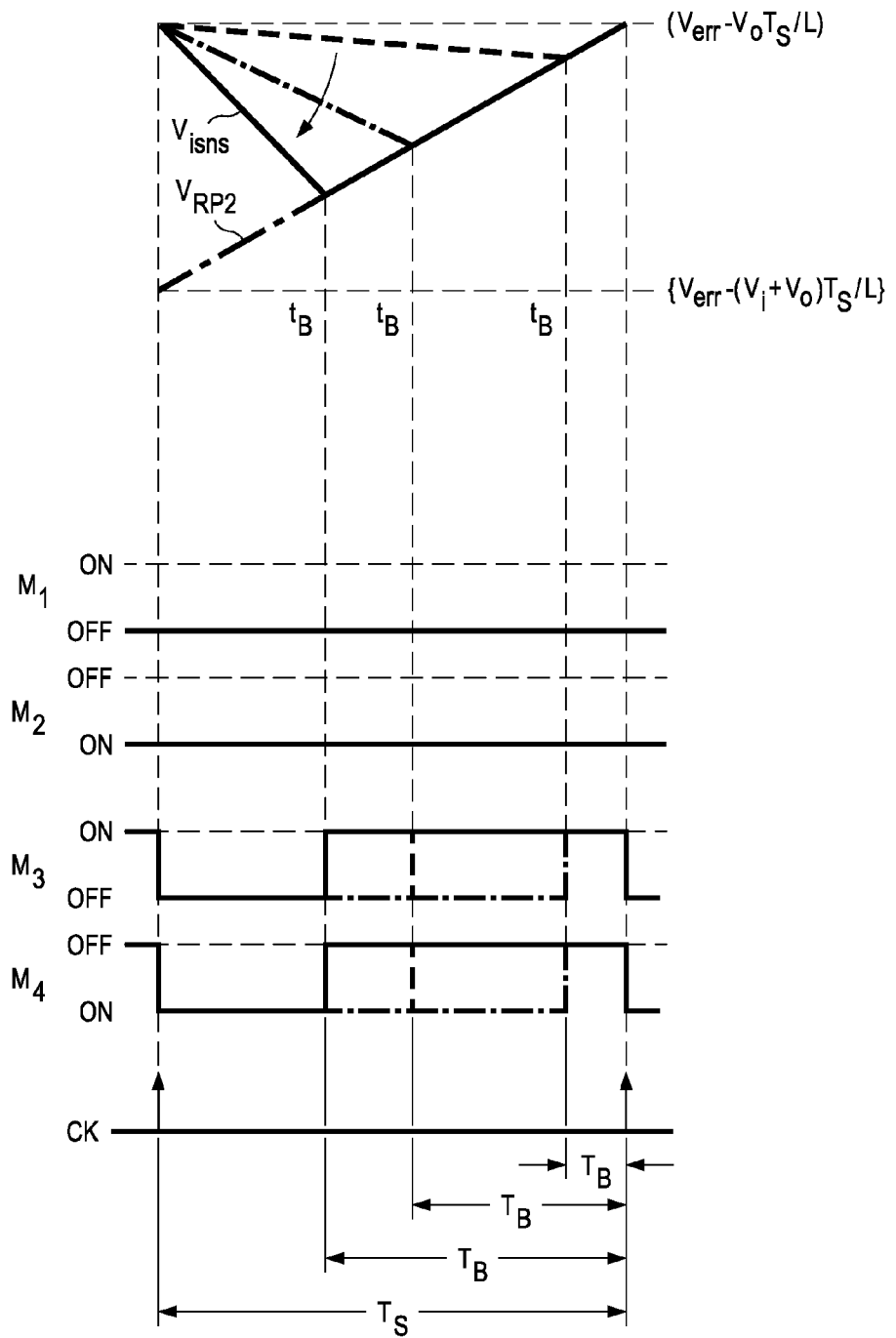
FIG. 13 is a diagram illustrating the state of variation in the waveforms of the various parts corresponding to decrease in the input voltage in the voltage boosting operation.

As shown in FIG. 13, during the period when the operating mode is changed from the pass mode to the voltage boosting mode, immediately after the start of the switching cycle, the slope (Vi−Vo)/L of decrease in the voltage level of current sense signal Visns decreases, and the time TB (on time of transistor M3) from crossing of current sense signal Visns with second variable sawtooth wave signal VRP2 to the end of the switching cycle becomes shorter. However, when input voltage Vi further decreases due to the consumption of the battery, the negative slope (Vi−Vo)/L of current sense signal Visns increases, and the on time (TB) of transistor M3 becomes longer.

When input voltage Vi falls to the prescribed lower threshold, the voltage monitor circuit (not shown in the figure) equipped with the electronic equipment is turned on to generate an alarm, or to turn off the operation of the electronic equipment and to prompt the user to re-charge the secondary battery. Also, when input voltage Vi rises from the level below the nominal value of output voltage Vo to a higher level, the operation move changes in the direction opposite to the aforementioned direction from the voltage boosting mode via the pass mode to the voltage reducing mode.

As explained above, for the voltage buck-boost switching regulator in this embodiment, input voltage Vi input to voltage input terminal 14, output voltage Vo obtained at voltage output terminal 15 and inductor current IL flowing in inductance coil 10 are detected or fed back, and, on the basis of the detected value or feedback value, controller 12 keeps output voltage Vo at the desired nominal voltage by performing the switching operation at the prescribed frequency selectively for either voltage reducing transistors M1, M2 or voltage boosting transistors M3, M4, and, at the same time, the duty ratio is under the control in the switching operation.

Corresponding to inductor current IL, the switching regulator performs voltage reducing operation or voltage boosting operation in the current mode. For this switching regulator, in its frequency characteristics, the secondary poles generated by inductance coil 10 and output capacitor Co are separated into two poles at a low frequency and a high frequency, respectively. Consequently, it is only necessary to have an integrator in the phase compensation circuit, and there is no need to have a complicated phase compensation network that would be needed in the voltage mode (an operating mode in which the voltage reducing operation or the voltage boosting operation is performed corresponding only to the voltage).

Figure 14:
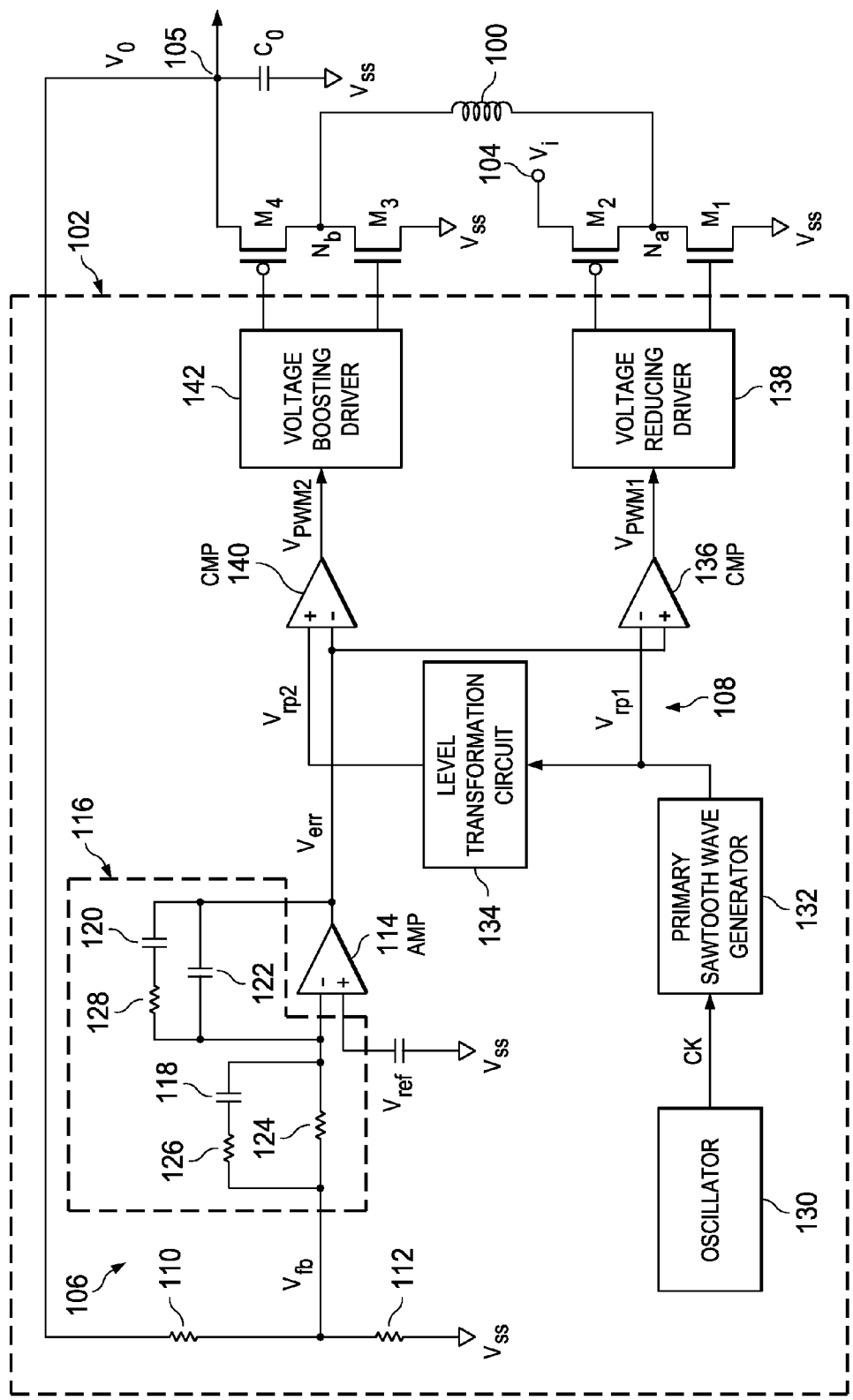
FIG. 14 is a circuit diagram illustrating the circuit constitution of a typical voltage buck-boost switching regulator of the prior art.
Figure 15:
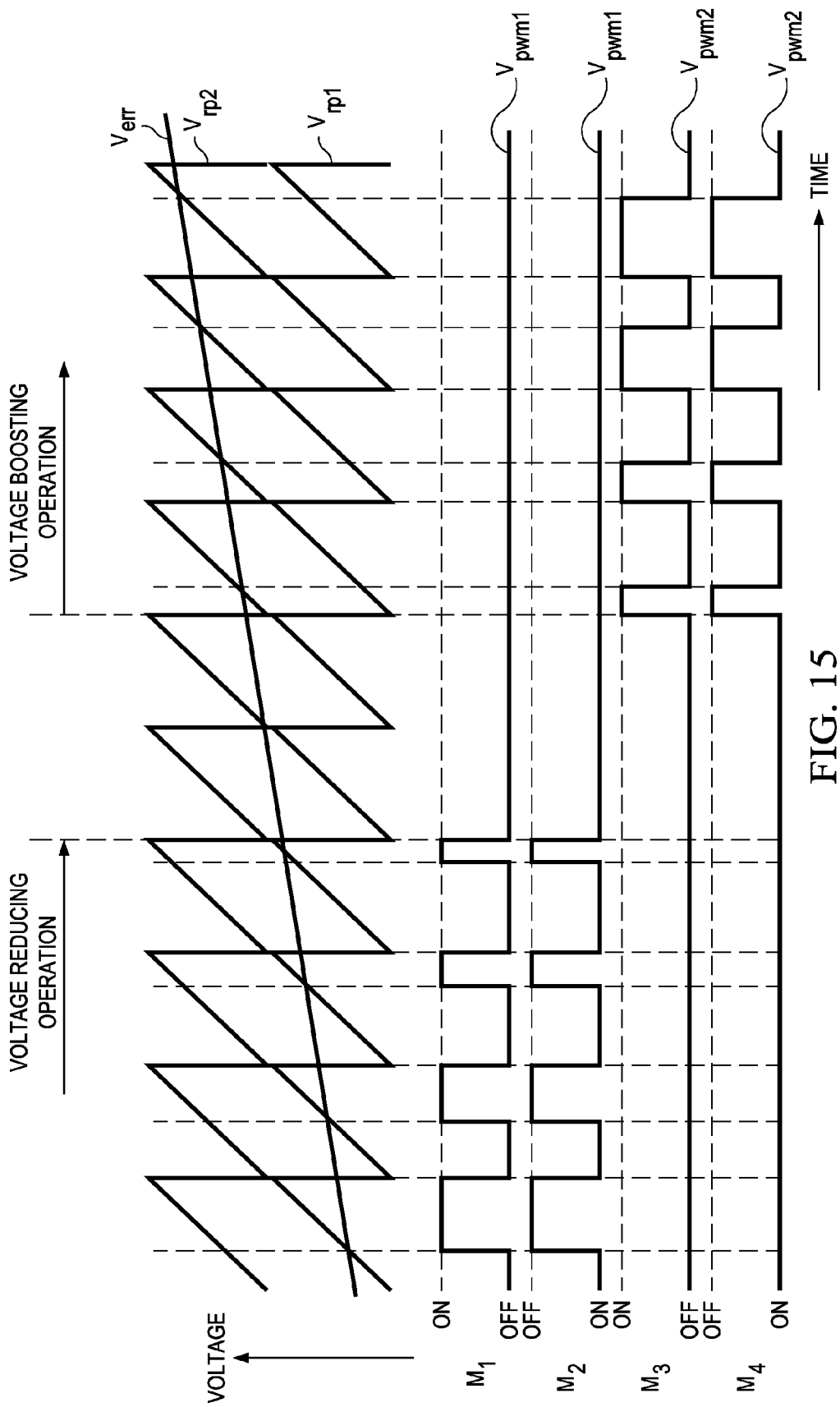
FIG. 15 is a waveform diagram illustrating the operation in said voltage buck-boost switching regulator of the prior art.

For the switching regulator manufactured as a semiconductor integrated circuit, when the number of the resistors and capacitors needed for performing phase compensation is larger, the size of the semiconductor chip carrying said switching regulator increases, and the cost rises. As explained above, the phase compensation circuit conventionally adopted in the voltage-mode voltage buck-boost switching regulator (FIG. 14) uses three resistors and three capacitors. On the other hand, the voltage buck-boost switching regulator used in said embodiment (FIG. 1) has a simple structure of the integrated circuit (phase compensation circuit) 34 and uses only one resistor 40 and one capacitor 42, yet it can perform stable high-speed voltage reducing and voltage boosting operations.

The constants of the integrator (phase compensation circuit) consisting of one resistor 40 and one capacitor 42 can be made corresponding to the same parameters in both voltage reducing operation and voltage boosting operation. As a result, the size of the semiconductor chip can be made smaller, and the cost can be cut. In addition, it is possible to output a stable constant voltage in a wide range of operating conditions.

Also, for the voltage buck-boost switching regulator in said embodiment (FIG. 1), transition from the voltage reducing mode to the voltage boosting mode, or transition from the voltage boosting mode to the voltage reducing mode can be performed smoothly during the switching operation, so that the switching of the DC-DC converter system can be performed with a high stability and at high speed. In addition, when input voltage Vi and output voltage Vo are near each other, the switching operation for all of voltage reducing transistors M1, M2 and voltage boosting transistors M3, M4 are turned off, and it is possible to work in the constant-voltage output mode (pass mode) without switching losses.

An embodiment of the present invention has been explained above. The present invention, however, is not limited to said embodiment. Various kinds of modifications, substitutions and alterations can be made within the scope of the technical idea of the present invention as defined by the appended claims.

An embodiment in which the switching circuits for voltage reducing and voltage boosting operations are made up of transistors M1, M2 and transistors M3, M4, respectively, was explained above. However, one may also adopt a scheme in which transistor M1 for the voltage reducing switching circuit or transistor M4 for the voltage boosting switching circuit is replaced with a diode. Also, various modifications may be made for the circuit constitution of phase compensation circuit 34, and phase compensation circuit 34 may be connected to the former stage of error amplifier 32.

There is no particular restriction on the means for detecting inductor current IL in inductor current sense circuit 22. For example, one may also adopt a scheme in which a resistance element for current detection is connected in series with inductance coil 10. Also, for the corresponding relationship between inductor current IL and current sense signal Visns, a prescribed coefficient or constant may be used.

The invention claimed is:

1. A voltage buck-boost switching regulator comprising:
a first switching circuit for voltage reducing connected between a voltage input terminal and one terminal of an inductance element;
a second switching circuit for voltage boosting connected between another terminal of said inductance element and the voltage output terminal;
an error amplifier that compares the output voltage obtained at a voltage output terminal or the output divided voltage obtained by a resistive voltage divider with a prescribed reference voltage, and amplifies the difference between them at a prescribed amplification rate to generate an error voltage;
a current sense circuit that detects an inductance current flowing in said inductance element and generates a current sense signal corresponding to said inductance current;
a variable sawtooth wave generator that generates a first variable sawtooth wave signal having a first top peak level and a first bottom peak level corresponding to said error voltage and a first slope corresponding to said output voltage, and a second variable sawtooth wave signal having a second top peak level and a second bottom peak level corresponding to said error voltage and a second slope corresponding to the input voltage input at said voltage input terminal;
a first switching controller that compares the voltage level of said current sense signal and the voltage level of said first variable sawtooth wave signal, and controls said first switching circuit corresponding to their magnitude relationship; and
a second switching controller that compares the voltage level of said current sense signal and the voltage level of said second variable sawtooth wave signal, and controls said second switching circuit corresponding to their magnitude relationship.

2. The voltage buck-boost switching regulator described in claim 1 comprising a phase compensation circuit for adjusting the frequency transfer function of the constant-voltage feedback loop with respect to said output voltage.

3. The voltage buck-boost switching regulator described in claim 2 wherein said phase compensation circuit comprises an integrator.

4. The voltage buck-boost switching regulator described in claim 3 wherein said phase compensation circuit comprises a resistor and a capacitor.

5. The voltage buck-boost switching regulator described in claim 4 wherein said phase compensation circuit is connected between the output terminal of said error amplifier and the reference voltage terminal.

6. The voltage buck-boost switching regulator described in claim 5 wherein said variable sawtooth wave generator comprises:
- an oscillator that generates a clock signal at a constant frequency;
- a first reference sawtooth wave generator that generates a first reference sawtooth wave signal synchronized with said clock signal and having a first slope proportional to said output voltage;
- a second reference sawtooth wave generator that generates a second reference sawtooth wave signal synchronized with said clock signal and having a second slope proportional to said input voltage;
- a first arithmetic and logic unit circuit that performs a first arithmetic and logic operation for said error voltage and said first reference sawtooth wave signal to generate said first variable sawtooth wave signal; and
- a second arithmetic and logic unit circuit that performs a second arithmetic and logic operation for said error voltage, said input voltage, said output voltage, and said second reference sawtooth wave signal to generate the second variable sawtooth wave signal.

7. The voltage buck-boost switching regulator described in claim 6 wherein said first arithmetic and logic unit circuit has a first subtracter that subtracts said first reference sawtooth wave signal from said error voltage to generate a first difference signal representing the difference between them, and it outputs said first difference signal as said first variable sawtooth wave signal.

8. The voltage buck-boost switching regulator described in claim 7 wherein said second arithmetic and logic unit circuit has a first adder that adds said input voltage and said output voltage to generate a first sum signal representing their sum, a multiplier that multiplies a prescribed constant to said first sum signal to generate a product signal representing their product, and a second adder that adds said second difference signal and said second reference sawtooth wave signal to generate a second sum signal representing their sum, and said second sum signal is output as said second variable sawtooth wave signal.

9. The voltage buck-boost switching regulator described in claim 8 wherein said constant has a value obtained by dividing the period of said clock with the inductance of said inductance element.

10. The voltage buck-boost switching regulator described in claim 6 wherein said first and second arithmetic and logic unit circuits are analog arithmetic and logic unit circuits.

11. The voltage buck-boost switching regulator described in claim 1 wherein the slope of said first variable sawtooth wave signal is negative, and the slope of said second variable sawtooth wave signal is positive.

12. The voltage buck-boost switching regulator described in claim 1 wherein the first bottom peak level of said first variable sawtooth wave signal is equal or approximately equal to the second top peak level of said second variable sawtooth wave signal.

13. The voltage buck-boost switching regulator described in claim 1 wherein said current sense circuit is connected to said voltage input terminal, said voltage output terminal and the two terminals of said inductance element.

14. The voltage buck-boost switching regulator described in claim 1 wherein said current sense signal has a voltage level proportional to the instantaneous value of said inductance current.

15. The voltage buck-boost switching regulator described in claim 1 wherein:
- said first switching circuit has a first switching element connected between said reference voltage terminal and one terminal of said inductance element, and a second switching element connected between said voltage input terminal and said one end of said inductance element; and
- said first switching controller performs a switching operation of said first switching circuit in said first switching circuit when the voltage level of said current sense signal crosses the voltage level of said first variable sawtooth wave signal; during the former period, from the start of each switching cycle to the time when the voltage level of said current sense signal crosses the voltage level of said first variable sawtooth wave signal, said first switching element is turned off; during the latter period, from the time when the voltage level of said current sense signal crosses the voltage level of said first variable sawtooth wave signal to end of said switching cycle, said first switching element is turned on, and said second switching element is turned off.

16. The voltage buck-boost switching regulator described in claim 1 wherein:
- said second switching circuit has a third switching element connected between said reference voltage terminal and said other terminal of said inductance element and a fourth switching element connected between said voltage output terminal and said other terminal of said inductance element; and
- said second switching controller performs a switching operation for said second switching circuit when the voltage level of said current sense signal crosses the voltage level of said second variable sawtooth wave signal; during a former period, from the start of each switching cycle to the time when the voltage level of said current sense signal crosses the voltage level of said second variable sawtooth wave signal, said third switching element is turned off and said fourth switching element is turned on; and, during a latter period, from the time when the voltage level of said current sense signal crosses the voltage level of said second variable sawtooth wave signal to end of said switching cycle, said third switching element is turned on and said fourth switching element is turned off.

* * * * *